(12) United States Patent
Donovan

(10) Patent No.: US 9,568,038 B2
(45) Date of Patent: Feb. 14, 2017

(54) DUAL-CONFIGURATION SHEAR BOLT

(71) Applicant: HALLIBURTON ENERGY SERVICES, INC., Houston, TX (US)

(72) Inventor: Stacey Blaine Donovan, Fort Worth, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 202 days.

(21) Appl. No.: 14/383,978

(22) PCT Filed: Oct. 9, 2013

(86) PCT No.: PCT/US2013/063999
§ 371 (c)(1),
(2) Date: Sep. 9, 2014

(87) PCT Pub. No.: WO2015/053760
PCT Pub. Date: Apr. 16, 2015

(65) Prior Publication Data
US 2016/0238055 A1 Aug. 18, 2016

(51) Int. Cl.
*F16B 31/02* (2006.01)
*E21B 34/06* (2006.01)
*E21B 7/06* (2006.01)
*E21B 29/06* (2006.01)

(52) U.S. Cl.
CPC ............ *F16B 31/021* (2013.01); *E21B 7/061* (2013.01); *E21B 29/06* (2013.01); *E21B 34/063* (2013.01)

(58) Field of Classification Search
None
See application file for complete search history.

(56) References Cited

U.S. PATENT DOCUMENTS

| 3,174,549 A | 3/1965 | Anderson |
| 3,386,138 A * | 6/1968 | Overman ............... E05B 51/023 411/348 |
| 3,408,890 A | 11/1968 | Bochman, Jr. |

(Continued)

FOREIGN PATENT DOCUMENTS

| CA | 2405993 | 10/2001 |
| CN | 101875404 | 11/2010 |

(Continued)

OTHER PUBLICATIONS

International Patent Application No. PCT/US2013/063999, "International Search Report and Written Opinion" mailed Jun. 27, 2014, 11 pages.

(Continued)

*Primary Examiner* — Jennifer H Gay
*Assistant Examiner* — Caroline Butcher
(74) *Attorney, Agent, or Firm* — Kilpatrick Townsend & Stockton LLP

(57) ABSTRACT

A dual-configuration shear bolt for coupling components of an assembly is provided. The dual-configuration shear bolt can include a body defining a chamber and a pin in the chamber. The body can include a shear portion. The pin can move between a shearing position and a non-shearing position. The pin can be retained within the shear portion by a retaining mechanism in the non-shearing position. The pin can be moved away from the shear portion to the shearing position.

17 Claims, 7 Drawing Sheets

(56) References Cited

U.S. PATENT DOCUMENTS

| | | |
|---|---|---|
| 4,400,112 A | 8/1983 | Castel et al. |
| 4,518,037 A | 5/1985 | Youngblood et al. |
| 5,035,292 A | 7/1991 | Bailey et al. |
| 5,595,247 A | 1/1997 | Braddick |
| 5,806,596 A | 9/1998 | Hardy et al. |
| 5,878,818 A | 3/1999 | Hebert et al. |
| 5,894,889 A | 4/1999 | Dewey et al. |
| 6,035,939 A | 3/2000 | Carter |
| 6,050,334 A | 4/2000 | McGarian et al. |
| 6,464,002 B1 | 10/2002 | Hart et al. |
| 6,719,045 B2 | 4/2004 | Hart et al. |
| 7,878,253 B2 | 2/2011 | Stowe et al. |
| 7,963,341 B2 | 6/2011 | Rios, III et al. |
| 7,980,307 B2 | 7/2011 | Saylor, III |
| 2002/0023757 A1 | 2/2002 | George et al. |
| 2010/0224372 A1 | 9/2010 | Stowe et al. |
| 2011/0215564 A1 | 9/2011 | Abrams |
| 2013/0112422 A1* | 5/2013 | Biddick .................. E21B 41/00 166/373 |

FOREIGN PATENT DOCUMENTS

| | | |
|---|---|---|
| CN | 202882858 | 4/2013 |
| KR | 19980052164 | 10/1998 |
| WO | 0058594 | 10/2000 |

OTHER PUBLICATIONS

Australian Patent Application No. 2013402497, First Examiner Report, mailed May 6, 2016, 2 pages.
Chinese Patent Office No. 2013800790954, Office Action, mailed Nov. 2, 2016, 10 pages.

\* cited by examiner

DUAL-CONFIGURATION SHEAR BOLT

CROSS-REFERENCE TO RELATED APPLICATIONS

This is a U.S. national phase under 35 U.S.C. 371 of International Patent Application No. PCT/US2013/063999, titled "Dual-Configuration Shear Bolt," filed Oct. 9, 2013, the entirety of which is incorporated herein by reference.

TECHNICAL FIELD

The present disclosure relates generally to mechanical devices and, more particularly (although not necessarily exclusively), to a dual-configuration shear bolt that can be used to couple components of tool assemblies.

BACKGROUND

Tool assemblies deployed into a well system (e.g., oil or gas wells for extracting fluids from a subterranean formation) may include multiple components or devices coupled together. For example, a tool assembly that includes multiple tools may be deployed into a wellbore, such as a whipstock assembly with a whipstock that is attached to a lead mill using a shear bolt. In some cases, one or more tools may be disconnected from the tool assembly prior to retrieving the tool assembly from the wellbore.

During deployment, large amounts of force may be applied to a tool assembly that includes a shear bolt connection between tools. Some shear bolts may be designed to shear at forces lower than the forces applied to the tool assembly during deployment. For cases in which forces applied to the tool assembly during deployment exceed the shear strength of the shear bolt, a shear bolt connection may shear and thereby prematurely decouple components of the tool assembly. Prematurely decoupling components of the tool assembly may result in costly delays or retrieval operations.

DETAILED DESCRIPTION

Figure 1:
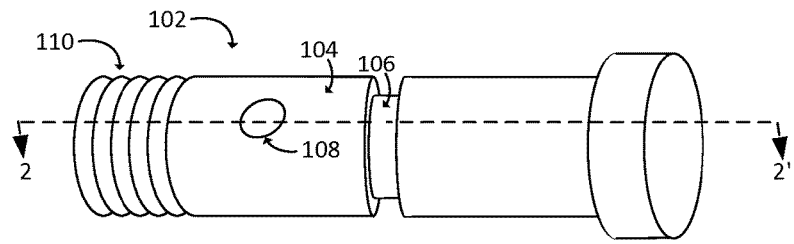
FIG. 1 is a perspective view of an example of a dual-configuration shear bolt according to one aspect of the present disclosure.

Certain aspects and features of the present disclosure are directed to a dual-configuration shear bolt usable in a wellbore tool or other suitable tool assemblies. The dual-configuration shear bolt can include a body defining a shear portion at which the bolt is to be sheared and an inner chamber at least partially surrounded by the shear portion. The shear portion can have a reduced cross-sectional area as compared to the rest of the body. A pin can be positioned in the chamber. The pin can be moved within the chamber to selectively set the dual-configuration shear bolt to a non-shearing configuration or a shearing configuration. In the non-shearing configuration, a given force can be insufficient to shear the shear bolt. In the shearing configuration, the same or greater amount of force can be sufficient to shear the shear bolt.

In a non-shearing configuration, the pin can be positioned in the chamber within the shear portion. The pin positioned within the shear portion can provide a combined cross-sectional area at the shear portion that includes the cross-sectional area of the shear bolt body at the shear portion and the cross-sectional area of the pin. The combined cross-sectional area can be sufficient to prevent the shear bolt from shearing. The pin can be positioned within the shear portion via any suitable mechanism. In some aspects, a spring positioned adjacent to the pin in the chamber can apply a force to the pin that maintains the pin in the position within the shear portion. In other aspects, a compressible material positioned adjacent to the pin in the chamber can apply a force to the pin that maintains the pin in the position within the shear portion. In other aspects, a retaining component coupled to or adjacent to the pin in the chamber can prevent the pin from moving away from the shear portion.

In a shearing configuration, the pin can be positioned in the chamber away from the shear portion. The pin being positioned away from the shear portion can provide a cross-sectional area at the shear portion that includes the cross-sectional area of the shear bolt body at the shear portion without the cross-sectional area of the pin. Reducing the cross-sectional area at the shear portion by moving the pin away from the shear portion can allow the dual-configuration shear bolt to be sheared.

In some aspects, the pin can be moved away from the shear portion by pressure communicated to the chamber via a port or other fluid communication path to the chamber. The pressure can cause a force to be applied to the pin that moves the pin away from the shear portion.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative aspects. The following sections use directional descriptions such as "above," "below," "upper," "lower," "upward," "downward," "left," "right," "uphole," "downhole," etc. in relation to the illustrative aspects as they are depicted in the figures, the upward direction being toward the top of the corresponding figure and the downward direction being toward the bottom of the corresponding figure, the uphole direction being toward the surface of the well and the downhole direction being toward the toe of the well. Like the illustrative aspects, the numerals and directional descriptions included in the following sections should not be used to limit the present disclosure.

FIG. 1 is a perspective view of an example of a dual-configuration shear bolt 102. The dual-configuration shear bolt 102 can be used to couple or otherwise attach tools or components together. The dual-configuration shear bolt 102 can be set to a non-shearing configuration and a shearing configuration, as described in detail below.

A body 104 of the dual-configuration shear bolt 102 can define a shear portion 106 and a port 108. A threaded portion 110 of the body can be used for fastening a first component to a second component by inserting the threaded portion into an opening in the second component. The shear portion 106 can have a smaller cross-sectional area as compared to the rest of the body 104. The smaller cross-sectional area of at the shear portion 106 can allow the dual-configuration shear bolt 102 in a shearing configuration to be sheared in response to a force being applied to the body 104. An amount of force used to shear the dual-configuration shear bolt 102 can be determined by the cross-sectional area of the shear portion 106 and the yield strength or other material properties of the material or materials from which the dual-configuration shear bolt 102 is formed. The port 108 can provide a fluid communication path from a pressure source to an inner diameter of the dual-configuration shear bolt 102.

Figure 2:
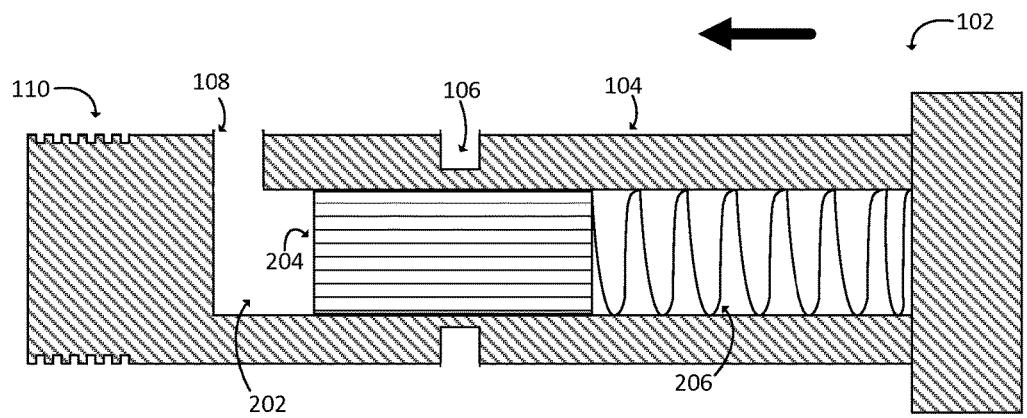
FIG. 2 is a cross-sectional view of an example of a dual-configuration shear bolt maintained in a non-shearing configuration by a spring according to one aspect of the present disclosure.

FIG. 2 is a cross-sectional view of an example of a dual-configuration shear bolt 102 that is set to a non-shearing configuration. The cross-sectional view of FIG. 2 is taken along the line 2-2' in FIG. 1.

The dual-configuration shear bolt 102 can include a movable pin 204 positioned in a chamber 202 defined by the body 104 of the dual-configuration shear bolt 102. A cross-sectional area of the pin 204 combined with the cross-sectional area of the body 104 at the shear portion 106 can be sufficient to prevent the dual-configuration shear bolt 102 from shearing in response to a shearing force applied to the body 104.

The dual-configuration shear bolt 102 can be set to the non-shearing configuration by the pin 204 being positioned at least partially within the shear portion 106. The spring 206 can be a compression spring that exerts a biasing force on the pin 204, as indicated by the leftward arrow in FIG. 2. The biasing force can maintain the pin 204 in the position within the shear portion 106.

Figure 3:
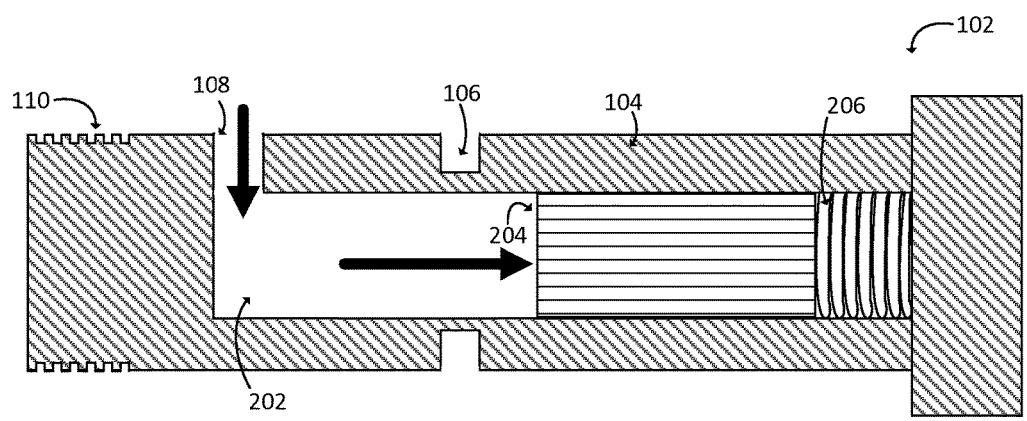
FIG. 3 is a cross-sectional view of the dual-configuration shear bolt of FIG. 2 set to a shearing configuration according to one aspect of the present disclosure.

FIG. 3 is a cross-sectional view of the dual-configuration shear bolt 102 of FIG. 2 that is set to a shearing configuration. The dual-configuration shear bolt 102 can be set to the shearing configuration by pressured communicated from a pressure source to the chamber 202 via the port 108, as depicted by the downward arrow in FIG. 3. The pressure in the chamber 202 can cause a force to be applied to the pin 204. The force applied to the pin 204 by the pressure can be greater than the force applied to the pin 204 by the spring 206. The greater force applied to the pin 204 by the pressure in the chamber 202 can shift the pin 204 toward the spring 206, as depicted by the rightward arrow in FIG. 3. The pin 204 being pushed against the spring 206 can compress the spring 206. The force applied to the pin 204 by the pressure in the chamber 202 can shift the pin 204 away from the shear portion 106. The pin 204 being shifted away from the shear portion 106 can reduce the total cross-sectional area at the shear portion 106. Reducing the total cross-sectional area at the shear portion 106 can allow the dual-configuration shear bolt 102 to be sheared in response to a shearing force applied to the shear portion 106.

Figure 4:
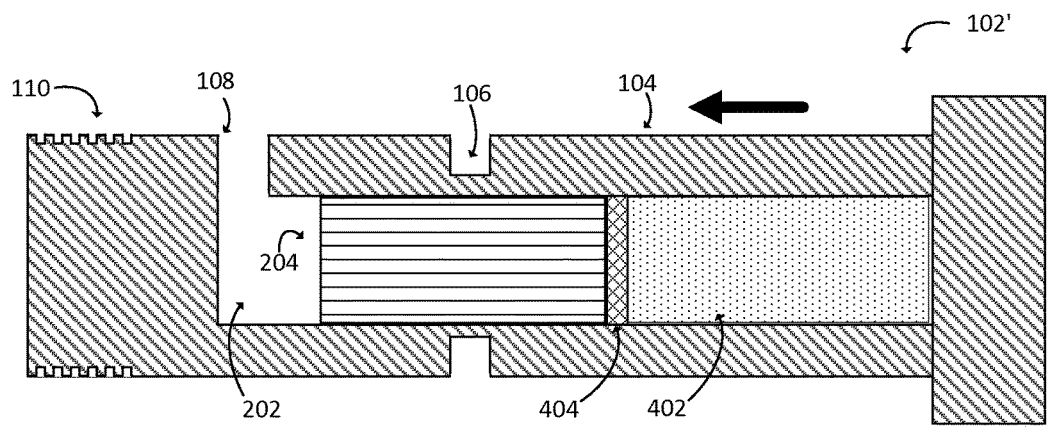
FIG. 4 is a cross-sectional view of an example of a dual-configuration shear bolt maintained in a non-shearing configuration by a compressible material according to one aspect of the present disclosure.

In additional or alternative aspects, the spring 206 can be replaced with a different mechanism for applying a force to the pin 204. For example, FIG. 4 is a cross-sectional view of an example of a dual-configuration shear bolt 102' in which the spring 206 of FIGS. 2-3 is replaced with a compressible material 402. The compressible material 402 can be positioned in the chamber 202 adjacent to the pin 204 and distal from the port 108. The compressible material 402 can exert a force on the pin 204, as indicated by the leftward arrow in FIG. 4. The force exerted by the compressible material 402 can maintain the pin 204 within the shear portion 106. The compressible material 402 can be any material suitable for exerting the force on the pin 204. Non-limiting examples of a compressible material 402 include a gas, a compressible liquid, a compressible solid.

The shear bolt 102' can also include a seal 404. The seal 404 can prevent the compressible material 402, which may be gases or compressible liquids, from flowing or otherwise moving past the pin 204 toward the port 108. The seal 404 can be formed from any suitable material. An example of suitable material is rubber. Non-limiting examples of the seal 404 include an O-ring that circumferentially surrounds the pin 204 and a plunger that is positioned between the pin 204 and the compressible material 402. In some aspects, the seal 404 can be omitted. For example, a dual-configuration shear bolt 102' using a compressible material 402 that is a solid may not include the seal 404.

Figure 5:
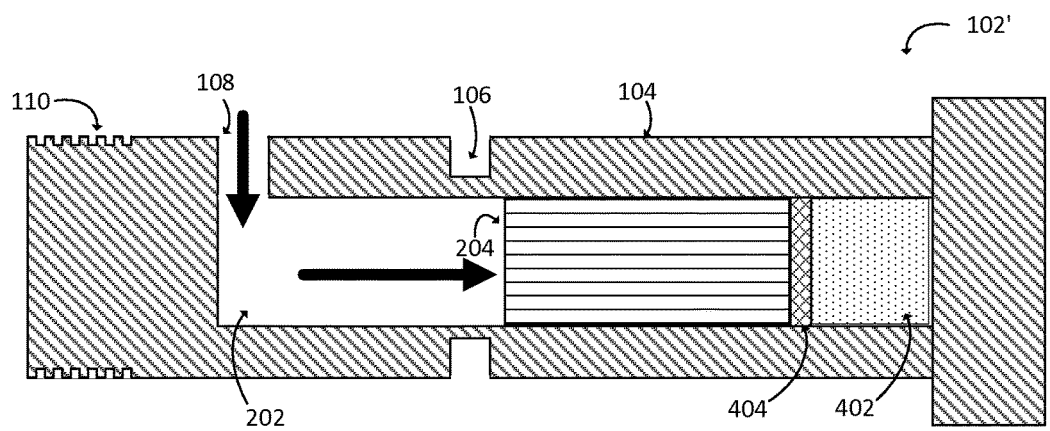
FIG. 5 is a cross-sectional view of the dual-configuration shear bolt of FIG. 4 set to a shearing configuration according to one aspect of the present disclosure.

FIG. 5 is a cross-sectional view of the dual-configuration shear bolt 102' of FIG. 4 set to a shearing configuration according to one example. The dual-configuration shear bolt 102 can be set to the shearing configuration by pressure communicated from a pressure source to the chamber 202 via the port 108, as depicted by the downward arrow in FIG. 5. The pressure in the chamber 202 can apply a force to the pin 204 that is greater than the force applied to the pin 204 by the compressible material 402. The greater force applied to the pin 204 by the pressure in the chamber 202 can shift the pin 204 and the seal 404 toward the compressible material 402, as depicted by the rightward arrow in FIG. 5. Pushing the pin 204 and the seal 404 against the compressible material 402 can compress the compressible material 402. The force applied to the pin 204 by the pressure in the chamber 202 can shift the pin 204 away from the shear portion 106, thereby allowing the dual-configuration shear bolt 102' to be sheared in response to a shearing force applied to the shear portion 106, as described previously with respect to FIG. 3.

Figure 6:
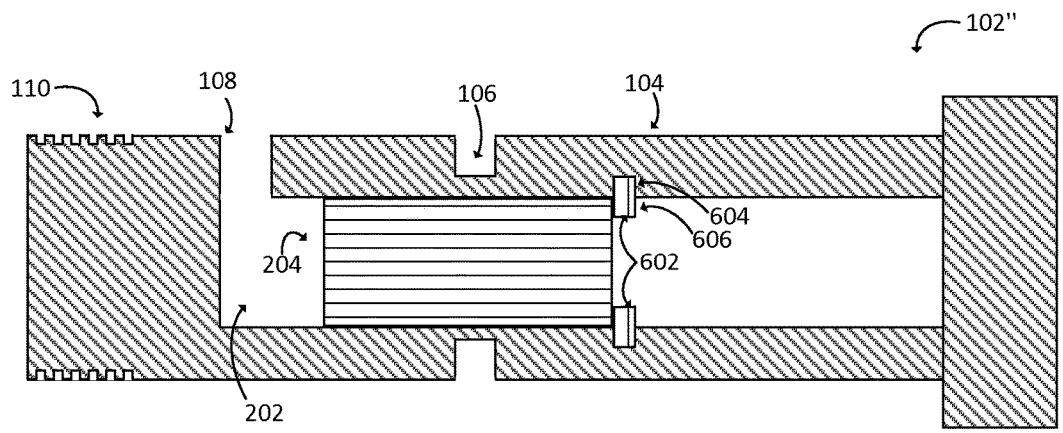
FIG. 6 is a cross-sectional view of an example of a dual-configuration shear bolt maintained in a non-shearing configuration according to one aspect of the present disclosure.

In additional or alternative aspects, a dual-configuration shear bolt can include a retaining component. For example, FIG. 6 is a cross-sectional view of an example of a dual-configuration shear bolt 102" that is maintained in a non-shearing configuration by a retaining component 602. Non-limiting examples of the retaining component 602 include one or more retaining pins and a snap ring or other retaining ring.

The retaining component 602 can be positioned in the chamber 202 to prevent the pin 204 from moving away from the shear portion 106. For example, a first portion 604 of the retaining component 602 can extend into the body 104 and a second portion 606 of the retaining component 602 can extend into the chamber 202. In some aspects, the portion 606 of the retaining component 602 can extend into the chamber 202 adjacent to an end of the pin 204, as depicted in FIG. 6. In other aspects, the portion 606 of the retaining component 602 can extend into an opening or groove in the pin 204 to prevent any movement of the pin 204. The retaining component 602 contacting the pin 204 can exert a force on the pin 204 that resists movement of the pin 204.

Figure 7:
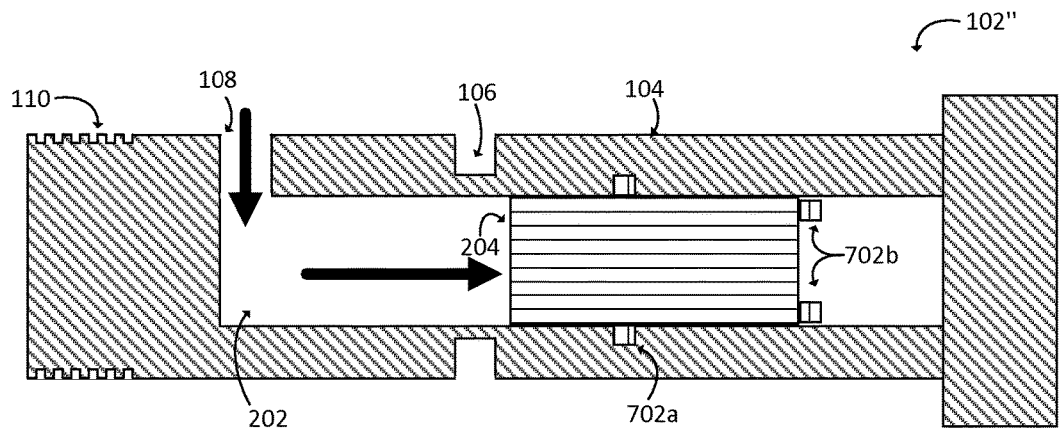
FIG. 7 is a cross-sectional view of the dual-configuration shear bolt of FIG. 6 set to a shearing configuration according to one aspect of the present disclosure.

FIG. 7 is a lateral, cross-sectional view of the dual-configuration shear bolt 102" of FIG. 6 set to a shearing configuration according to one example. Pressure communicated to the chamber 202 via the port 108 can apply a force to the pin 204, as depicted by the downward and rightward arrows in FIG. 7. The shear strength of the retaining component 602 can be less than a force caused by the pressure. The force applied to the pin 204 by the pressure can shear the retaining component 602 into portions 702a, 702b. Shearing the retaining component 602 can allow the pin 204 to move away from the shear portion 106. In some aspects, the dual-configuration shear bolt 102" can include a tension spring attached to the pin 204 that can exert a force on the pin 204 for pulling the pin 204 away from the shear portion 106. Moving the pin 204 away from the shear portion 106 can allow the dual-configuration shear bolt 102" to be sheared. The dual-configuration shear bolt 102" can be sheared by applying a shearing force to the shear portion 106.

Figure 8:
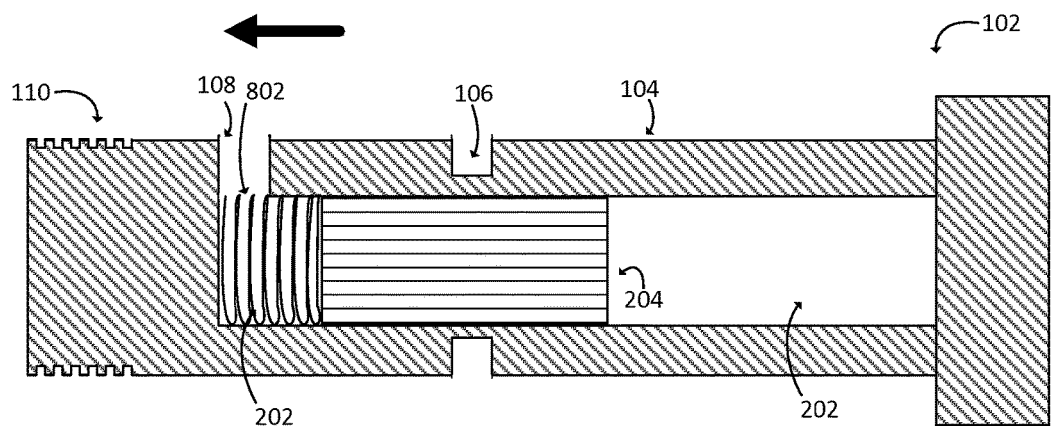
FIG. 8 is a cross-sectional view of an example of a dual-configuration shear bolt maintained in a non-shearing configuration by a tension spring according to one aspect of the present disclosure.

In additional or alternative aspects, a tension spring can be used to maintain the pin 204 in the non-shearing configuration. For example, example, FIG. 8 is a cross-sectional view of an example of a dual-configuration shear bolt 102''' that is maintained in a non-shearing configuration by a spring 802. The spring 802 can be a tension spring that exerts a biasing force on the pin 204, as indicated by the leftward arrow in FIG. 8. The biasing force can maintain the pin 204 in the position within the shear portion 106.

Figure 9:
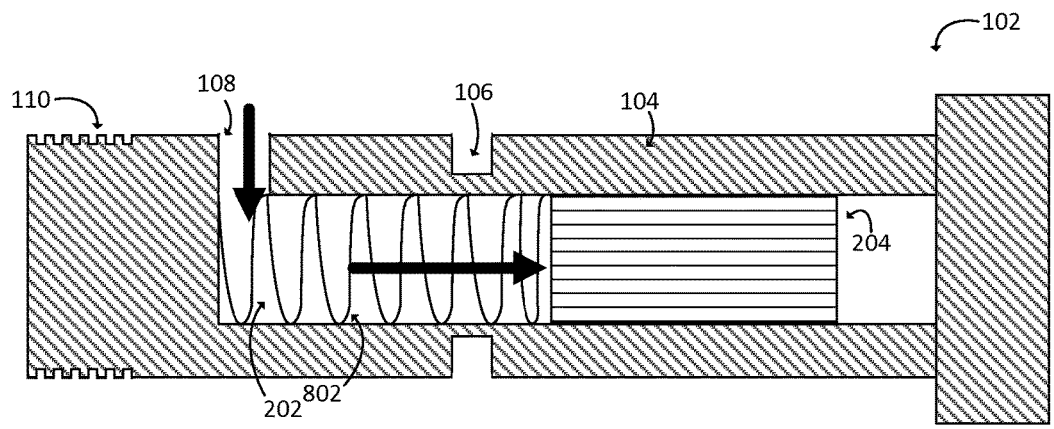
FIG. 9 is a cross-sectional view of the dual-configuration shear bolt of FIG. 8 set to a shearing configuration according to one aspect of the present disclosure.

FIG. 9 is a cross-sectional view of the dual-configuration shear bolt 102''' of FIG. 8 that is set to a shearing configuration. The dual-configuration shear bolt 102''' can be set to the shearing configuration by pressured communicated from a pressure source to the chamber 202 via the port 108, as depicted by the downward arrow in FIG. 9. The pressure in the chamber 202 can cause a force to be applied to the pin 204. The force applied to the pin 204 by the pressure can be greater than the force applied to the pin 204 by the spring 802. The greater force applied to the pin 204 by the pressure in the chamber 202 can shift the pin 204 toward the spring 802, as depicted by the rightward arrow in FIG. 9. The pin 204 being pushed against the spring 802 can extend the spring 802. The force applied to the pin 204 by the pressure in the chamber 202 can shift the pin 204 away from the shear portion 106. The pin 204 being shifted away from the shear portion 106 can reduce the total cross-sectional area at the shear portion 106. Reducing the total cross-sectional area at the shear portion 106 can allow the dual-configuration shear bolt 102''' to be sheared in response to a shearing force applied to the shear portion 106.

A dual-configuration shear bolt 102 can be used to couple components in any suitable tool assembly. For example, FIG. 10 is a lateral view of an example of a whipstock assembly 900 that includes a dual-configuration shear bolt 102.

The whipstock assembly 900 can be positioned in a wellbore 902 of a well system to perform milling, drilling, or other operations. The wellbore 902 can extend through various earth strata of a subterranean formation 904. A tubing string 906 within wellbore 902 can extend from the surface to the subterranean formation 904. The tubing string 906 can be used for any suitable purpose in a well system. A non-limiting example of such a purpose is to provide a conduit for formation fluids produced from the subterranean formation 904 to travel to the surface. Pressure from a bore in a subterranean formation 904 can cause formation fluids, including production fluids such as gas or petroleum, to flow to the surface.

The whipstock assembly 900 can include a whipstock 908 and a milling tool 910 (e.g., a lead mill) having blades 912. The whipstock assembly 900 can be deployed into the wellbore with the whipstock 908 coupled to the milling tool 910 via the dual-configuration shear bolt 102. Deploying the whipstock assembly 900 can involve latching the whipstock assembly 900 to the tubing string 906 at a position at which milling is to be performed. The milling tool 910 can be decoupled from the whipstock 908 by shearing the dual-configuration shear bolt. Decoupling the milling tool 910 from the whipstock 908 can allow the milling tool 910 to move more freely and thereby perform milling at the desired position in the wellbore 902.

Figure 10:
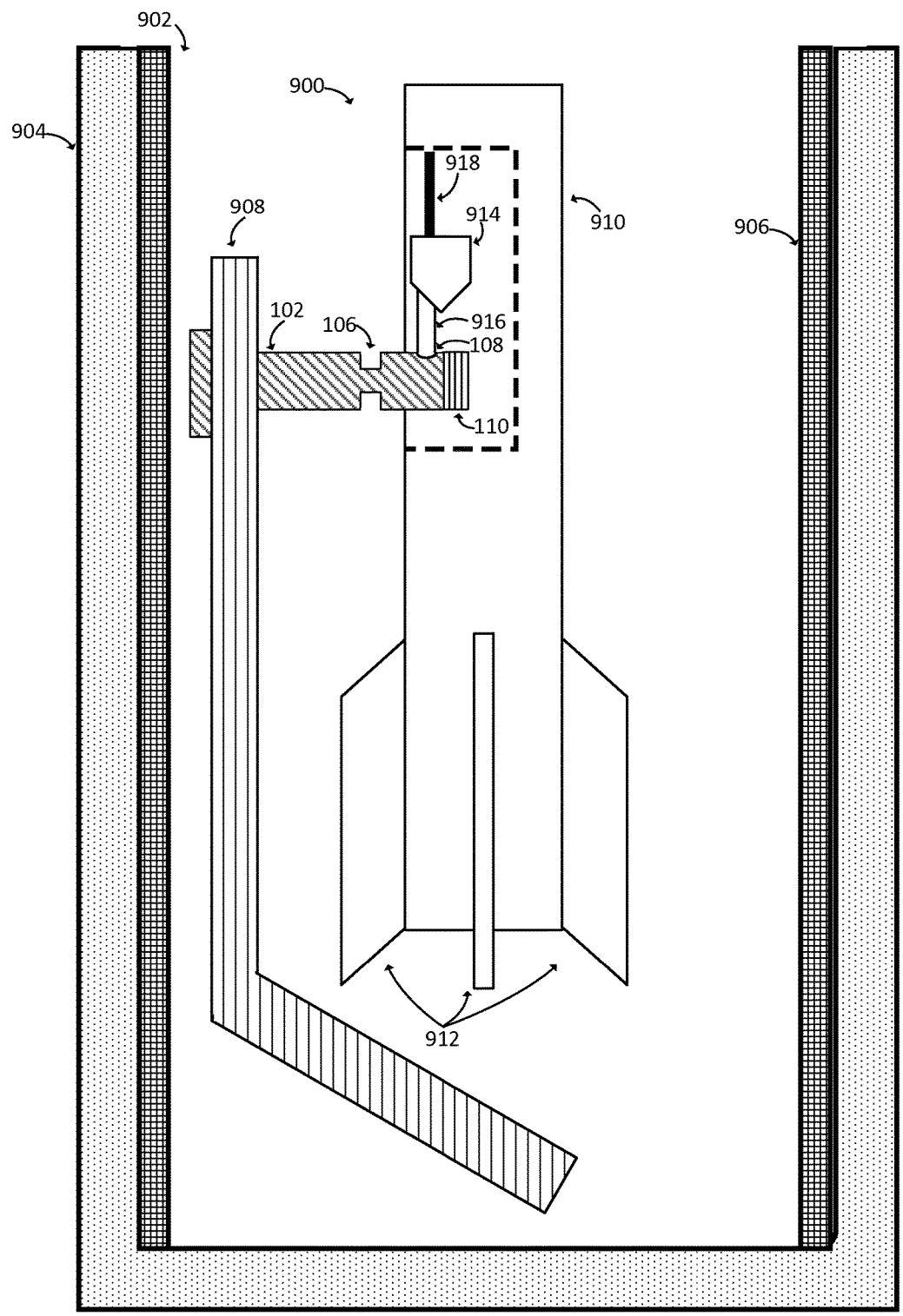
FIG. 10 is a lateral, cross-sectional view of a whipstock assembly that includes a dual-configuration shear bolt according to one aspect of the present disclosure.

The milling tool 910 can include a pressurizing device 914, as depicted in the cutaway view of the milling tool 910 delineated by a dashed line in FIG. 10. The pressurizing device 914 can be connected to a control line 918. Pressure can be communicated to the pressurizing device 914 via the control line 918. An outlet of the pressurizing device 914 can be connected to the port 108 of the dual-configuration shear bolt 102 via a pipe 916 or other suitable fluid path. The pressurizing device 914 can communicate pressure to the chamber 202 of the dual-configuration shear bolt 102 via the port 108, thereby setting the dual-configuration shear bolt 102 to a shearing configuration. The pressurizing device 914 can use any suitable pressure source. In some aspects, a pressure source at the surface of the wellbore 902 can communicate pressure to the pressurizing device 914 via the control line 918. In other aspects, pressure from the wellbore 902 can be communicated to the pressurizing device 914 via the control line 918.

In a non-limiting example, the dual-configuration shear bolt 102 can support heavier loads in the non-shearing configuration and lighter loads in the shearing configuration. For example, deployment of the whipstock assembly 900 into the wellbore 902 may involve the dual-configuration shear bolt 102 supporting loads of up to 100,000 pounds. The dual-configuration shear bolt 102 may be set to the non-shearing configuration during deployment of the whipstock assembly 900. The dual-configuration shear bolt 102 in the shearing configuration may support lighter loads of 30,000 pounds. Decoupling the milling tool 910 from the whipstock 908 can involve applying a shearing force (e.g., a pushing or pulling force) in excess of 30,000 pounds to the milling tool 910. Applying a shearing force in excess of 30,000 pounds to the milling tool 910 can shear the shear bolt 102, thereby decoupling the milling tool 910 from the whipstock 908.

Although use of the dual-configuration shear bolt 102 is described above with respect to a whipstock assembly 900, the dual-configuration shear bolt 102 can be used in any tool, assembly, or other device that includes a shear bolt.

Figure 11:
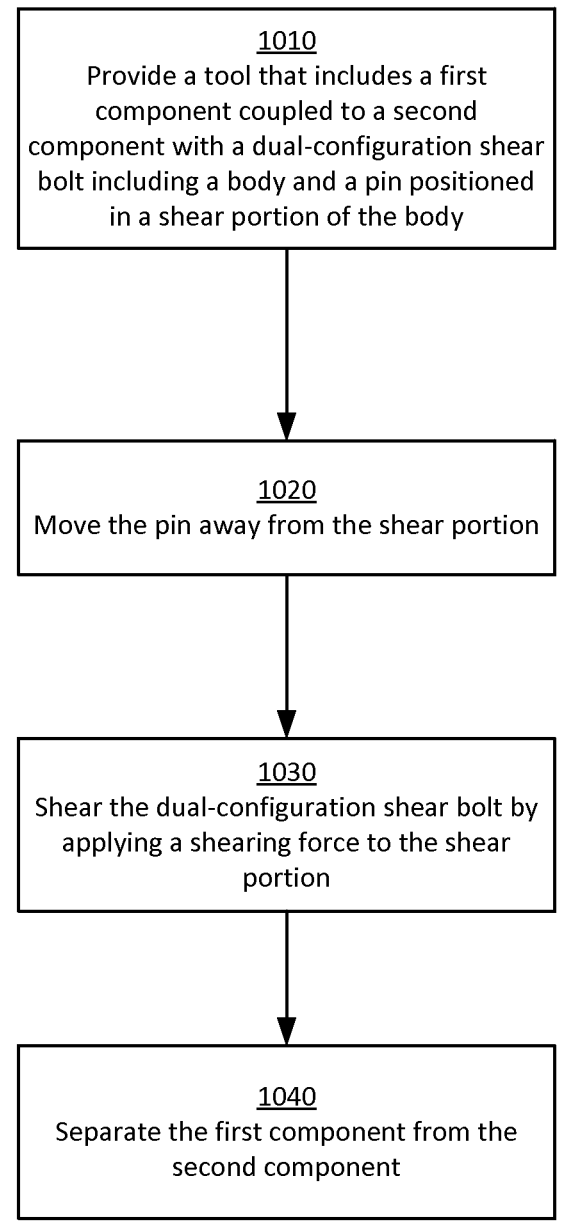
FIG. 11 is a flow chart illustrating an example method for operating a tool that includes a dual-configuration shear bolt according to one aspect of the present disclosure.

FIG. 11 is a flow chart illustrating an example method 1000 for operating a tool that includes a dual-configuration shear bolt 102. For example, a tool string deployed into a wellbore may include components or devices (e.g., a sliding sleeve) that are to be retained in a first position during deployment of the tool string and moved to another position after the tool string is positioned at a desired location in the wellbore.

The method 1000 involves providing a tool that includes a first component coupled to a second component with a dual-configuration shear bolt 102, as shown in block 1010. The dual-configuration shear bolt 102 includes a body 104 and a pin 204 positioned in a shear portion 106, as described above with respect to FIGS. 1-9.

In one non-limiting example, providing a tool can involve deploying a tool string that includes a first tool and a second tool. It may be desirable to decouple the first tool from the second tool and retrieve the first tool from the wellbore. Prior to a retrieval operation, the first and second tools can be coupled together with the dual-configuration shear bolt 102.

In another non-limiting example, providing a tool can involve deploying a tool with a movable component, such as (but not limited to) a piston, mandrel, etc. The dual-configuration shear bolt 102 can be used to prevent premature actuation of the tool. For example, it may be desirable to prevent the movable component from moving prior to the tool being properly positioned in the wellbore. The movable component being coupled to a fixed portion of the tool with the dual-configuration shear bolt 102 can prevent the movable component from moving.

The method 1000 also involves moving the pin 204 away from the shear portion 106 of the body 104, as shown in block 1020. Non-limiting examples of the movement of the pin 204 are described above with respect to FIGS. 3, 5, 7, and 9. For example, moving the pin 204 can involve communicating pressure to the pin 204 via a fluid communication path defined by the body 104, such as a port 108. Moving the pin can also include compressing a spring positioned in the chamber 202 adjacent to the pin 204 or shearing a shear pin or a retaining ring in contact with the pin 204.

The method 1000 also involves shearing the dual-configuration shear bolt 102 by applying a shearing force to the shear portion 106, as shown in block 1030.

The method 1000 also involves separating the first component from the second component, as shown in block 1040.

For a tool string with one or more retrievable tools, separating the first and second components can involve moving the retrievable tools away from the non-retrievable tools. Retrieving the retrievable tools can involve setting the dual-configuration shear bolt 102 to the shearing configuration, shearing the dual-configuration shear bolt 102, and removing the retrievable tools from the wellbore.

For a tool including a movable component, separating the first and second components can involve moving the movable component away from a fixed portion of the tool. After the tool is properly positioned in the wellbore, the dual-configuration shear bolt 102 can be set to the shearing configuration and sheared, thereby allowing the movable component to move (e.g., allowing a piston to stroke, allowing a mandrel to extend, etc.).

Figure 12:
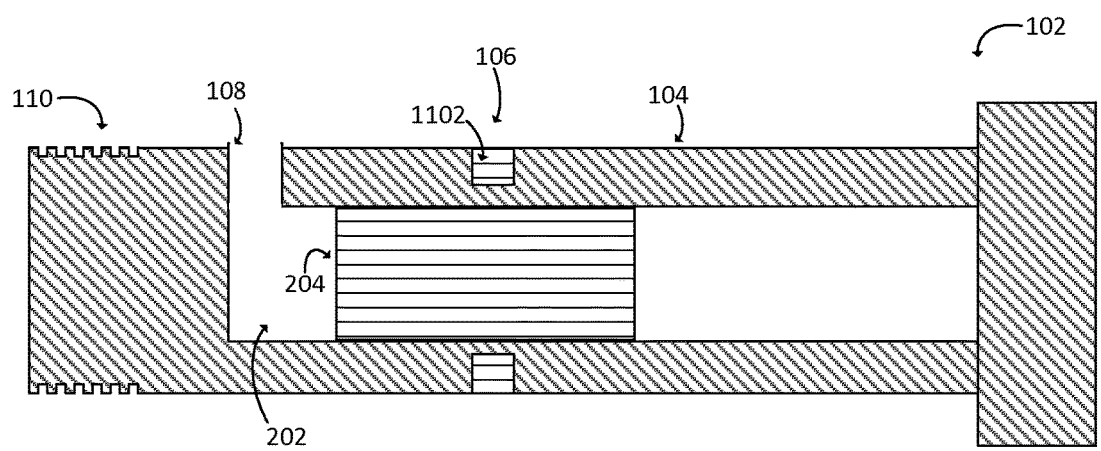
FIG. 12 is a cross-sectional view of an example of a dual-configuration shear bolt having a shear portion formed from a shearing material according to one aspect of the present disclosure.

Although FIGS. 1-11 depict a shear bolt having a shear portion 106 that has a smaller width than the rest of the body 104, other implementations are possible. For example FIG. 12 is a cross-sectional view of an example of a dual-configuration shear bolt 102 having a shear portion 106 that is at least partially formed from a shearing material 1102 according to one aspect of the present disclosure. The shear portion 106 can be wholly or partially formed using the shearing material 1102. In some aspects, the shear portion 106 formed using the shearing material 1102 can have the same or similar width as other portions of the body 104. The shearing material 1102 can be any material having a shear strength that is less than material used to form other portions of the body 104. The dual-configuration shear bolt 102 can include a pin 204 that can be retained or moved using any suitable mechanism or structure, such as (but not limited to) the mechanisms or structures depicted in FIGS. 2-9.

In some aspects, a dual-configuration shear bolt can be provided. The dual-configuration shear bolt can include a body defining a chamber and a pin in the chamber. The body can have a shear portion that has a smaller width than another portion of the body. In some aspects, the shear portion can circumferentially surround the chamber. The pin can be moved between a shearing position and a non-shearing position. The pin can be retained within the shear portion by a retaining mechanism in the non-shearing position. The pin can be moved away from the shear portion to the shearing position. In some aspects, the retaining mechanism can include a shear pin or a retaining ring in contact with the pin for retaining the pin in the non-shearing position. In other aspects, the retaining mechanism can include a spring positioned in the chamber adjacent to the pin. The spring can be compressed in response to moving the pin from the non-shearing position to the shearing position. In other aspects, the retaining mechanism can include a compressible material positioned in the chamber adjacent to the pin. The compressible material can be compressed in response to moving the pin from the non-shearing position to the shearing position. Non-limiting examples of a compressible material include a liquid or a gas. In some aspects, the dual-configuration shear bolt can include comprising a seal positioned between the pin and the liquid or the gas. In some aspects, the body of the dual-configuration shear bolt can also define a fluid communication path to the chamber. Pressure can be communicated to the chamber for moving the pin from the non-shearing position to the shearing position. In some aspects, the dual-configuration shear bolt can also include a threaded portion adjacent to the chamber and operable for fastening a first component to a second component.

In additional or alternative aspects, a downhole assembly is provided for a well system. The downhole assembly can include a first component and a second component coupled to the first component with a dual-configuration shear bolt. In some aspects, the first component can be a whipstock and the second component can include a milling tool. The dual-configuration shear bolt can include a body defining a chamber and a pin positioned in the chamber. The body can have a shear portion that has smaller width than another portion of the body. The pin can be moved between a shearing position and a non-shearing position. The pin can be retained within the shear portion by a retaining mechanism in the non-shearing position. The pin can be moved away from the shear portion to the shearing position for the shear bolt. In some aspects, the retaining mechanism can include a shear pin or a retaining ring in contact with the pin for retaining the pin in the non-shearing position. In other aspects, the retaining mechanism can include a spring positioned in the chamber adjacent to the pin, the spring compressible in response to moving the pin from the non-shearing position to the shearing position. In other aspects, the retaining mechanism can include a compressible material positioned in the chamber adjacent to the pin, the compressible material compressible in response to moving the pin from the non-shearing position to the shearing position. In some aspects, the compressible material further can include a liquid or a gas. A seal can be positioned between the pin and the liquid or the gas.

In some aspects, the dual-configuration shear bolt can also include a threaded portion adjacent to the chamber and inserted into an opening of at least one of the first component or the second component. In some aspects, the downhole assembly can also include a pressurizing device in fluid communication with the pin via a fluid communication path defined by the body. The pressurizing device can communicate pressure to the pin for moving the pin from the non-shearing position to the shearing position.

In additional or alternative aspects, a downhole assembly is provided for a well system. The downhole assembly can include a first component and a second component coupled to the first component with a dual-configuration shear bolt. The dual-configuration shear bolt can include a body defining a chamber and a fluid communication path to the chamber as well as a pin in the chamber. The body can have a shear portion having a smaller width than another portion of the body. The pin can be moved from a first position in the chamber within the shear portion to a second position in the chamber away from the shear portion. A combined cross-sectional area of the pin and the shear portion can prevent shearing of the shear portion in response to a shearing force. A cross-sectional area of the shear portion without the pin can allow shearing of the shear portion in response to the shearing force. The downhole assembly can also include a pressurizing device in fluid communication with the pin via the fluid communication path defined by the body of the dual-configuration shear bolt. The pressurizing device can communicate pressure to the pin for moving the pin from the first position to the second position. In some aspects, the dual-configuration shear bolt can include a spring positioned in the chamber adjacent to the pin. The spring can be compressed in response to the pressure being communicated to the pin. In other aspects, the dual-configuration shear bolt can include a liquid or gas positioned in the chamber adjacent to the pin. A seal can be positioned between the pin and the liquid or the gas. The liquid or the gas can be compressed in response to the pressure being communicated to the pin. In other aspects, the dual-configuration shear bolt can include a shear pin or a retaining ring in contact with the pin for retaining the pin in the first position. The shear pin or the retaining ring can have a shear strength less than a force caused by the pressure. Pressure communicated to the shear pin or the retaining ring can shear the shear pin or the retaining ring.

In additional or alternative aspects, a method is provided. The method can involve coupling a first component to a second component with a dual-configuration shear bolt. The dual-configuration shear bolt can include a body defining a chamber and a pin positioned in the chamber. The body can have a shear portion that has a smaller width than another portion of the body. The can be moved between a shearing position and a non-shearing position. The pin can be retained within the shear portion by a retaining mechanism in the non-shearing position. The pin can be moved away from the shear portion to the shearing position for the shear bolt. The method can also involve moving the pin from the shearing position to the non-shearing position. The method can also involve shearing the dual-configuration shear bolt by applying a shearing force to the shear portion. In some aspects, wherein moving the pin can include communicating pressure to the pin via a fluid communication path defined by the body. In other aspects, moving the pin can include compressing a spring positioned in the chamber adjacent to the pin. In other aspects, moving the pin can include shearing at least one of a shear pin or a retaining ring in contact with the pin for retaining the pin in the non-shearing position.

The foregoing description of the disclosure, including illustrated aspects and examples has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure. Aspects and features from each example disclosed can be combined with any other example.

What is claimed is:

1. A dual-configuration shear bolt comprising:
   a body defining a chamber, the body having a shear portion; and
   a pin positioned in the chamber, the pin being moveable between a shearing position and a non-shearing position, the pin being retained within the shear portion by a retaining mechanism in the non-shearing position, the pin being movable away from the shear portion to the shearing position for the shear bolt,
   wherein the body further defines a fluid communication path to the chamber for communicating pressure for moving the pin from the non-shearing position to the shearing position.

2. The dual-configuration shear bolt of claim 1, wherein the retaining mechanism comprises a spring positioned in the chamber adjacent to the pin, the spring being compressible in response to moving the pin from the non-shearing position to the shearing position.

3. The dual-configuration shear bolt of claim 1, wherein the retaining mechanism comprises a compressible material positioned in the chamber adjacent to the pin, the compressible material being compressible in response to moving the pin from the non-shearing position to the shearing position.

4. The dual-configuration shear bolt of claim 3, wherein the compressible material further comprises at least one of a liquid or a gas and further comprising a seal positioned between the pin and the liquid or the gas.

5. The dual-configuration shear bolt of claim 1, wherein the retaining mechanism comprises at least one of a shear pin or a retaining ring in contact with the pin for retaining the pin in the non-shearing position.

6. The dual-configuration shear bolt of claim 1, wherein the shear portion has a smaller width than another portion of the body.

7. The dual-configuration shear bolt of claim 6, further comprising a threaded portion adjacent to the chamber and operable for fastening a first component to a second component.

8. A downhole assembly comprising:
   a first component; and
   a second component coupled to the first component with a dual-configuration shear bolt, the dual-configuration shear bolt comprising:
   a body defining a chamber, the body having a shear portion that has a smaller width than another portion of the body; and
   a pin positioned in the chamber, the pin being moveable between a shearing position and a non-shearing position, the pin being retained within the shear portion by a retaining mechanism in the non-shearing position, the pin being movable away from the shear portion to the shearing position for the shear bolt, wherein the body further defines a fluid communication path, the downhole assembly further comprising a pressurizing device in fluid communication with the pin via the fluid communication path, the pressurizing device operable for communicating pressure to the pin for moving the pin from the non-shearing position to the shearing position.

9. The downhole assembly of claim 8, wherein the retaining mechanism comprises a spring positioned in the chamber adjacent to the pin, the spring compressible in response to moving the pin from the non-shearing position to the shearing position.

10. The downhole assembly of claim 8, wherein the retaining mechanism comprises a compressible material positioned in the chamber adjacent to the pin, the compressible material compressible in response to moving the pin from the non-shearing position to the shearing position.

11. The downhole assembly of claim 10, wherein the compressible material further comprises at least one of a liquid or a gas and wherein the dual-configuration shear bolt further comprises a seal positioned between the pin and the liquid or the gas.

12. The downhole assembly of claim 8, wherein the retaining mechanism comprises at least one of a shear pin or a retaining ring in contact with the pin for retaining the pin in the non-shearing position.

13. The downhole assembly of claim 8, wherein the first component is a whipstock and the second component comprises a milling tool.

14. The downhole assembly of claim 8, wherein the dual-configuration shear bolt further comprises a threaded portion adjacent to the chamber and inserted into an opening of at least one of the first component or the second component.

15. A method comprising:
providing a tool, the tool comprising a first component coupled to a second component with a dual-configuration shear bolt, the dual-configuration shear bolt comprising a body and a pin positioned in a shear portion of the body that has a smaller width than another portion of the body;
moving the pin away from the shear portion by communicating pressure to the pin via a fluid communication path defined by the body;
shearing the dual-configuration shear bolt by applying a shearing force to the shear portion; and
separating the first component from the second component.

16. The method of claim 15, wherein moving the pin further comprises compressing a spring positioned in the body adjacent to the pin.

17. The method of claim 15, wherein moving the pin further comprises shearing at least one of a shear pin or a retaining ring in contact with the pin for retaining the pin in a non-shearing position.

* * * * *